(12) United States Patent
Richman

(10) Patent No.: US 6,535,128 B2
(45) Date of Patent: *Mar. 18, 2003

(54) METHOD AND APPARATUS FOR IDENTIFICATION OF OBJECTS

(76) Inventor: Daniel H. Richman, 20782 Honeygrove Rd., Alsea, OR (US) 97324

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,238

(22) Filed: Feb. 18, 1999

(65) Prior Publication Data

US 2002/0044056 A1 Apr. 18, 2002

(51) Int. Cl.[7] .................................. G08B 13/14
(52) U.S. Cl. .................. 340/572.1; 340/568.1; 340/572.8; 235/986
(58) Field of Search .................. 340/568.1, 568.6, 340/568.8, 572.1, 572.4, 572.8; 235/98 C, 98 R, 385

(56) References Cited

U.S. PATENT DOCUMENTS

| | | | |
|---|---|---|---|
| 4,036,365 A | 7/1977 | Rosenfeld | 209/3.1 |
| 4,136,778 A | 1/1979 | Wortman et al. | 378/45 |
| 4,484,066 A * | 11/1984 | DeBlieux et al. | 235/98 C |
| 4,849,999 A | 7/1989 | Humphreys et al. | 377/6 |
| RE33,054 E | 9/1989 | Markham | 235/385 |
| 5,175,499 A * | 12/1992 | Davies | 324/300 |
| 5,312,136 A * | 5/1994 | Capozzola | 283/75 |
| 5,801,628 A * | 9/1998 | Maloney | 340/568.1 |
| 5,936,527 A * | 8/1999 | Isaacman et al. | 340/572.1 |
| 5,974,150 A * | 10/1999 | Kaish et al. | 713/179 |
| 6,043,443 A * | 3/2000 | Doran et al. | 209/573 |

* cited by examiner

*Primary Examiner*—Van Trieu
(74) *Attorney, Agent, or Firm*—Banner & Witcoff, Ltd.

(57) ABSTRACT

A system for identifying and counting articles, such as laundry and dry cleaning items, using a preassigned identification tag. The system uses a plurality of spheres which are carried in an article identification tag. Using a combination of spheres, each of which may have different characteristics, the identification tag can be scanned for the different characteristics of the spheres and the article identified according. The identity of the article may also be determined on the basis of the number and position of the spheres in the identification tag and/or on the basis of the size and position of the spheres.

14 Claims, 3 Drawing Sheets

METHOD AND APPARATUS FOR IDENTIFICATION OF OBJECTS

BACKGROUND OF THE INVENTION

The present invention relates generally to the field of inventory control and more particularly, is directed to a method and apparatus for identifying and counting objects using a preassigned identification tag.

The method and apparatus of the present invention has wide application in a number of fields where it is necessary to quickly, accurately and automatically identify objects for purposes of counting or sorting. The invention will be described herein with reference to inventory control of laundry and dry cleaning items. The invention is, however, not limited thereto.

In a laundry or dry cleaner, it is often necessary to sort the various items by color, type of fabric, size or degree of soiling as it is more efficient and cost effective to process a large number of similar items at the same time. In some situations, it is also necessary to sort items in accordance with a promised customer delivery schedule. Moreover, customized processing, such as the amount of starch to be used with a laundered shirt, requires additional sorting effort.

One way in which the sorting process can be completed is to do it manually with workers at one or more sorting stations. While manual sorting may be the easiest to implement, it is fraught with a number of problems and disadvantages. These problems include the fact that a manual sorting process is often labor intensive and tedious, especially when done on a continuous basis. Moreover, the reliability of human sorters will become suspect as the workers tire or lose their focus and attention on the task.

In addition, the process is complicated by the fact that the laundry is dirty and may well emit a foul order. Thus, human sorters are not likely to approach the task with a great deal of enthusiasm and motivation. Moreover, dirty laundry imposes certain health risks to human sorters which can not fully be eliminated, even with the use of rubber gloves and other protective garments.

In appreciation of the need to eliminated manual sorting, a number of methods and devices have been proposed for sorting and/or counting laundry items. As disclosed in U.S. Pat. No. 4,136,778 issued in the name of Wortman et al., one such method senses the identity of an item by passing the item through a sensing station where the amount of light reflected from a coded tag attached to the item indicates its identity. In order for such a system to be effective however, the coded tag must be in a predetermined orientation at the time it is sensed. Needless to say, proper orientation of the tag is not always practical when one considers that laundry items presented for sorting often arrive in random orientation where many tags may be covered over by adjacent laundry items.

The Wortman patent notes that other prior art identification techniques include the use of uniform fields which permit identification based on perturbations of the field caused by identification tags. A further prior art technique involves the use of x-rays, Gamma rays and the like which when impinged on an identification tag or label results in secondary radiation. The secondary radiation can be detected and used for identification purposes. The Wortman patent is said to be an improvement on the use of secondary radiation as an identification mechanism.

U.S. Pat. No. 4,036,365 issued in the name of Rosenfeld is another example of a sorting techniques which relies on secondary radiation.

While the techniques disclosed in the Wortman and Rosenfeld patents represent an improvement over prior techniques, these improvements remain deficient in a number of areas. Accordingly, there is a great need in the art for an improved method and apparatus for automatically sorting and counting items such as laundry and dry cleaning articles.

SUMMARY OF THE INVENTION

Accordingly, it is an objective of the present invention to obviate the above-noted shortcomings and disadvantages of present methods and apparatus for sorting and counting items such as laundry and dry cleaning articles.

It is a further objective of the present invention to provide an improved method and apparatus for sorting and counting items with imposing no inconvenience to the user or operator of the system.

It is a still further objective of the present invention to provide an improved method and apparatus for sorting and counting items which is economical to implement and simple in operation.

It is a further objective of the present invention to provide an improved method and apparatus for sorting and counting items which is more economical than prior art approaches.

It is a still further objective of the present invention to provide an improved method and apparatus for sorting and counting items which can be readily implemented in an existing system.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

A preferred embodiment of the present invention will now be described with reference to the accompanying drawing.

The sorting and counting system of the present invention allows items to be identified without them being handled or singulated before they are automatically scanned. In other words, the items may be scanned, identified and counted as a group rather than one at a time.

Applicant realized that the only object which has the same profile regardless of the direction of view or scanning angle, is a sphere. Accordingly, each item which is to be identified and counted is tagged with one or more spheres of differing diameters. These spheres are used to form a code which identifies the object.

The spheres may be constructed in such a manner that the scanner used to view them can distinguish between spheres of the same size by color, density, reflectivity, capacitance, magnetic properties, or by any other means. Thus, these characteristics establish a "signature" for each sphere.

In the case where an x-ray scanner is used, the spheres may be made in such a manner that they allow different amounts of radiation to penetrate through to the detector, thus giving spheres several different signatures. The spheres may also be formed of two or more concentric layers of varying signatures which the scanning system would be able to differentiate. This would give more possible sphere signatures.

Where x-ray scanning is used, for example, the outer layer of the sphere may be made of steel over an inner sphere made of lead. Since x-rays penetrate these materials at different rates, the layers are distinguishable by the x-ray scanner.

Figure 1:
FIG. 1 is a diagram of one embodiment of the spheres used in the sorting and counting system of the present invention.

FIG. 1 illustrates one embodiment of a sphere in accordance with the present invention. The diameter of the sphere may be of any convenient size and will depend on the particular identification code to be used. If a binary identification code is used, the sphere will come in two sizes sufficiently different so that they can be distinguished by the scanner.

Figure 2:
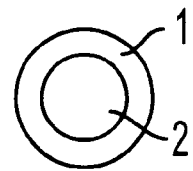
FIG. 2 is a cross-section of one embodiment of the spheres used in the sorting and counting system of the present invention, wherein the spheres are made from two different layered material.

FIG. 2 is a cross-section of one embodiment of the sphere. In this embodiment, the sphere is made from two different layered material 1 and 2. In this embodiment, spheres with different combinations of layered materials can be used to form an identification code.

Items may be sorted or counted by tagging one or more items with the spheres described above. The item is then passed through the scanning device. The scanning device must be able to scan in at least three orthogonal planes. The information obtained from these scans is then used to provide the size and location of each of the tag spheres.

The type of scanner to be used with the present invention is not important. Current technologies which may be used include, x-rays, Gamma ray, ultrasound, radio frequency radiation, infrared, visible light or magneto resonance. Other well known scanning technologies may also be used.

Figure 3:
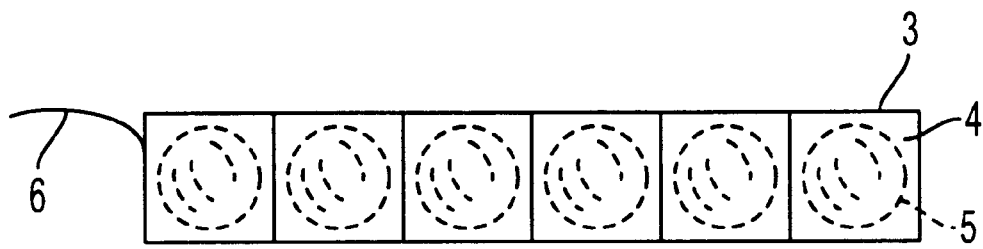
FIGS. 3–5 are diagrams of a carrier used to hold a plurality of spheres in accordance with a predetermined identification coding scheme.

A plurality of spheres may be used together to identify a particular item. The spheres may be held by a carrier 3 as shown in FIG. 3. Carrier 3 contains a pocket 4 which is used to carry a plurality of spheres 5. The size, density or other characteristics of each of spheres 5 is determined in accordance with a particular code which identifies the item to which carrier 3 is to be attached. Carrier 3 may be attached to an item by an attachment string 6. Other ways of attaching carrier 3 to an item includes clips and pins.

Figure 4:
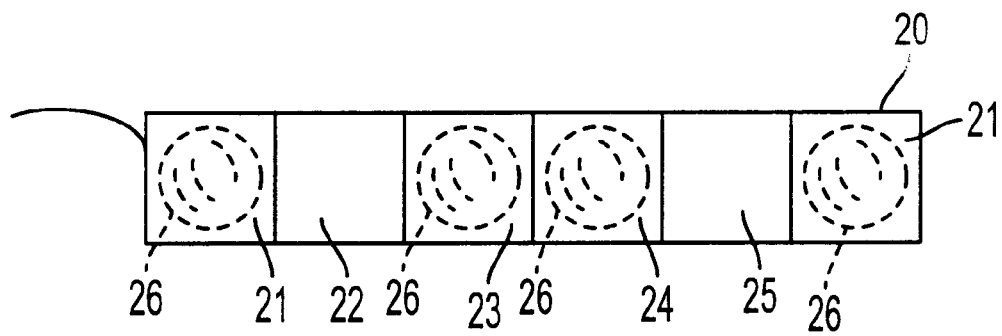

FIG. 4 illustrates a carrier 20 which includes a plurality of pockets 21–26. Certain of the pockets, i.e., 21, 23, 24 and 26, carry a sphere 26 while the remaining pockets are empty. The present or absence of a sphere in a pocket can also be used as a unique binary coding technique for identifying an item.

Figure 5:
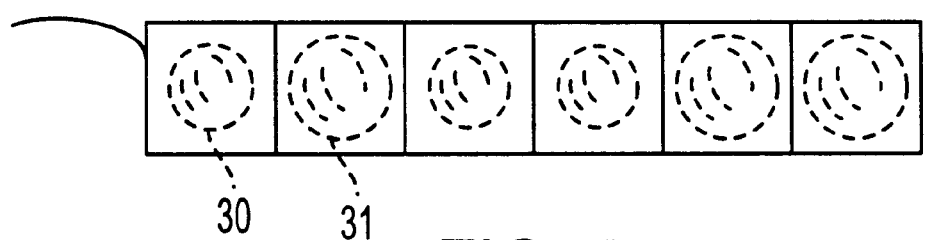

FIG. 5 illustrates a similar binary coding technique where some pockets have a small sphere 30 while other pockets have a large sphere 31. Whether the pocket has a small or large sphere can thus, be used to form a unique identification code for an item.

Figure 6:
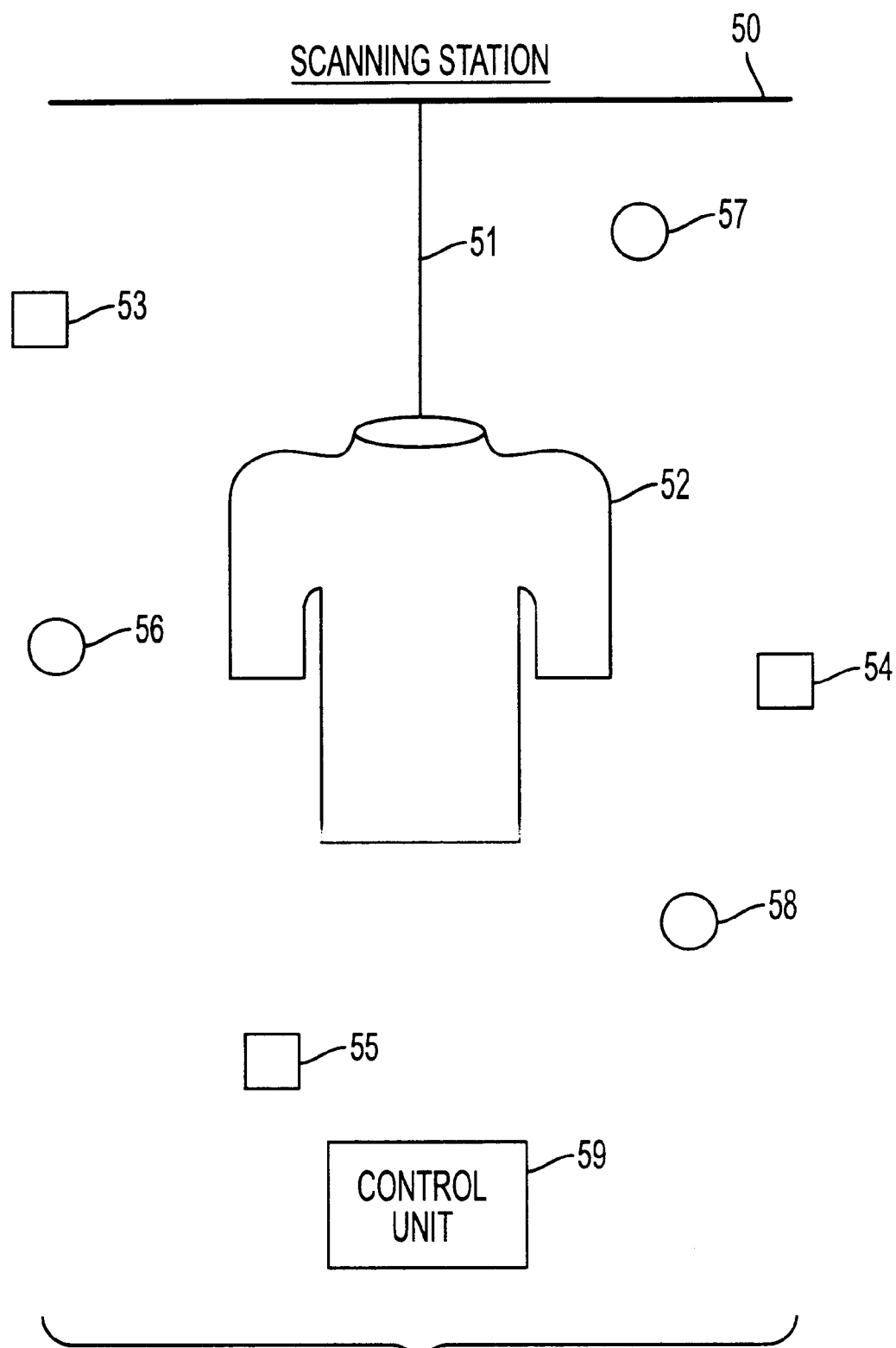
FIG. 6 is a diagram of a sorting and counting station in accordance with the present invention.

FIG. 6 illustrates a scanning station where items to be scanned and identified are brought. The items can be brought to the station by a mechanical conveyer system 50 as known in the prior art. In the conveyer system shown in FIG. 5, each item 52 to be identified is suspended from conveyer system 50 by a hanger 51 as also known in the art.

The items to be sorted or counted are passed to the sorting station by conveyer system 50 where they are scanned by a plurality of scanners 53, 54 and 55. A plurality of corresponding detectors 58, 56 and 57 also are provided. The scanners and detectors are coupled to a control unit 59 which controls the operation of the system.

Control unit 59 coordinates the movement the conveyer system 50 in moving each item to be identified into the scanning station. Control unit 59 also energizes scanners 53, 54 and 55 at the proper time and also receives the corresponding detector signals from detectors 54, 56 and 57. Based on the receipt of the detector signals in its coded form, control unit 59 identifies the item in accordance with the coding technique used by the system.

Figure 7:
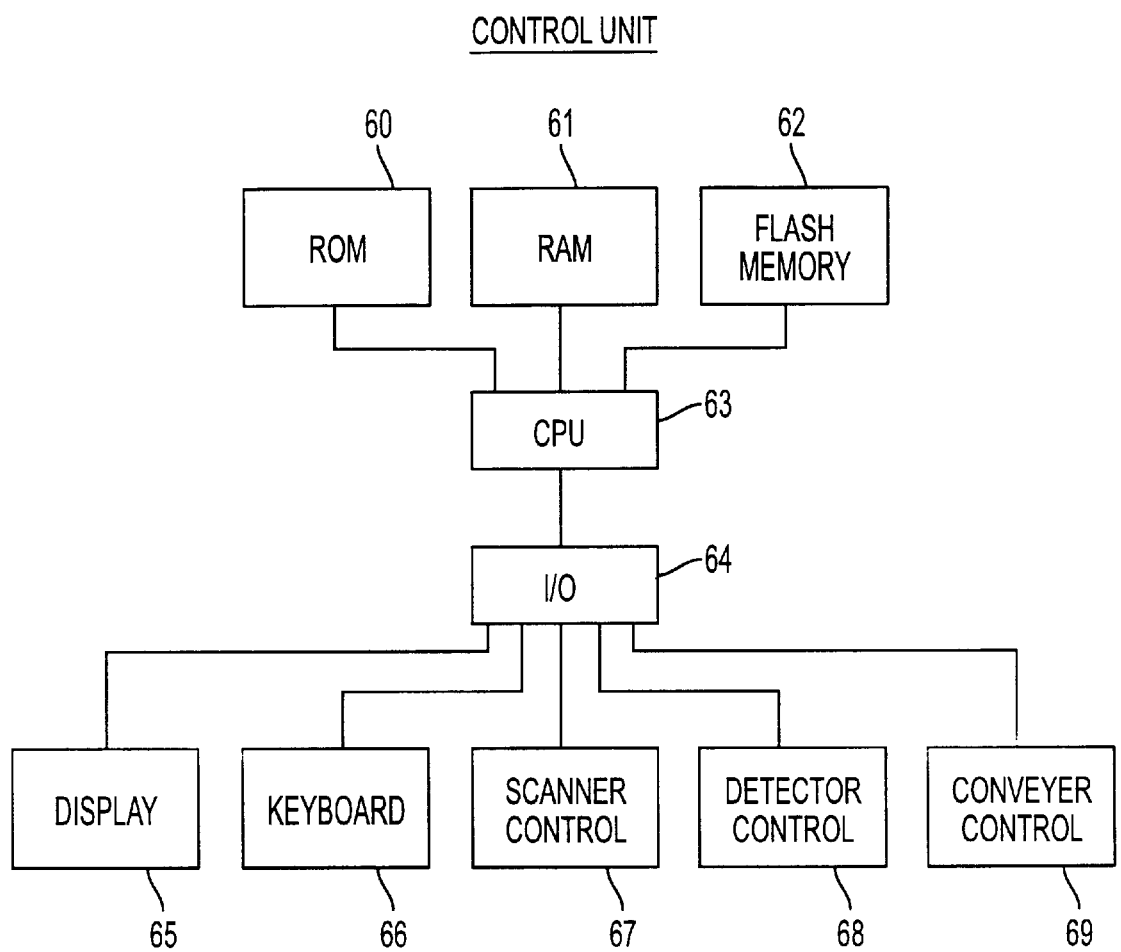
FIG. 7 is a block diagram of one embodiment of a control unit which can be used to control the operation of the sorting and counting station illustrated in FIG. 6.

FIG. 7 is a block diagram of one embodiment of control unit 59. The control unit includes a number of interconnected elements. A central processing unit (CPU) 63 controls the operation and function of each of the elements. Connected to CPU 63 are random access memory (RAM) 61, non-volatile flash memory 62 and read only memory 60. These memory elements store data and computer control routines which are executed by CPU 63 in order to carry out its control functions.

CPU 63 also is coupled to an input/output interface (I/O) 64 to which a plurality of peripheral devices are attached. These peripheral devices include a display 65 which can be used to provide status and operational information to the system user. Of course, the identification information provided by the system can also be displayed to the user on display 65 or be recorded in system memory for later use. Display 65 may be formed of an LCD screen, a CRT screen or merely be a plurality of indicator lamps as is known in the art.

A keyboard 66 also is attached to I/O 64 so that the control unit can receive manual commands from the user. Keyboard 66 may be a full computer style keyboard, a keypad or be formed of various function switches and buttons as also known in the art.

As discussed above with respect to FIG. 6, the control unit controls the operation of the scanner and associated detectors. This is accomplished using scanner control 67 and detector control 68 illustrate in FIG. 7. Control of the movement of conveyer 50 is likewise accomplished by conveyer control 69. These control functions are provided by CPU 63 in accordance with a computer program stored in ROM 60, RAM 61 and/or flash memory 62.

Using the scanning and identification system of Applicant's invention, it is not necessary that the items to be identified arrive at the scanning station in any particular order or orientation. The system can accurately identify the item without regard to the orientation or position of the item or the identification carrier.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A system for automatically identifying an article using an identification tag carried by said article, said system comprising:

a sphere made of a material having unique characteristics;

a detector for detecting the present of said sphere and providing an electrical signal descriptive of said unique characteristics;

a control unit coupled to said detector and receiving said electrical signal, said control unit using said electrical signal to identify said article; and wherein said identification tag includes a carrier for carrying a plurality of said spheres.

2. The system of claim 1 further including a scanner for scanning said identification tag, said scanner being used by said detector to detect the presence of said sphere and provide said electrical signal.

3. The system of claim 2, wherein said control unit includes a central processing unit for evaluating said electrical signal in order to identify said articles of clothing.

4. The system of claim 1 wherein said sphere is made of first and second materials, said first material being layered over said second material.

5. The system of claim 1, wherein said carrier is formed of a plurality of pockets, selected ones of said pockets being used to hold a sphere.

6. The system of claim 5, wherein the presence or absence of a sphere within particular ones of said pockets- forms an identification code, the identity of said articles of clothing being determined in accordance with said identification code.

7. The system of claim 6, further including a scanner for scanning said identification tag, said scanner being used by said detector to detect the presence or absence of said spheres within said pockets and providing said electrical signal accordingly.

8. The system of claim 7, wherein said control unit includes a central processing unit for evaluating said electrical signal in order to identify said articles of clothing.

9. A system for automatically identifying randomly positioned articles of clothing using an identification tag carried by a plurality of said articles of clothing, said system comprising:

a carrier formed within said identification tag for carrying a plurality of spheres, said carrier have a plurality of pockets for carrying respective said spheres;

said spheres being formed in a plurality of sizes;

a detector for detecting the size of each of said spheres and providing a corresponding electrical signal; and a control unit coupled to said detector and receiving said electrical signal, said control unit using said electrical signal to identify respective ones of said articles of clothing.

10. The system of claim 9 further including a scanner for scanning said identification tag, said scanner being used by said detector to detect the sizes of said spheres and provide said electrical signal.

11. The system of claim 10, wherein said control unit includes a central processing unit for evaluating said electrical signal in order to identify said articles of clothing.

12. The system of claim 11, wherein the respective sizes of said spheres within particular ones of said pockets forms an identification code, the identity of said articles of clothing being determined in accordance with said identification code.

13. The system of claim 12, further including a display for indicating to the user the identification of said articles of clothing.

14. The system of claim 13, further including an input device for providing user commands to said system.

* * * * *